United States Patent
Seid et al.

(10) Patent No.: US 6,321,767 B1
(45) Date of Patent: *Nov. 27, 2001

(54) HIGH FLOW SOLENOID CONTROL VALVE

(75) Inventors: David L. Seid, North Muskegon; Hamid Najmolhoda, Grand Rapids, both of MI (US)

(73) Assignee: Saturn Electronics & Engineering, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/480,196

(22) Filed: Jan. 10, 2000

(51) Int. Cl.[7] .................................................. F15B 13/044
(52) U.S. Cl. .................. 137/15.21; 137/596.17; 137/596.2; 137/625.65
(58) Field of Search ............................ 137/15.21, 596.17, 137/596.2, 625.65

(56) References Cited

U.S. PATENT DOCUMENTS

| | | | |
|---|---|---|---|
| 3,656,076 | 4/1972 | Prouty et al. | 335/240 |
| 3,884,417 | 5/1975 | Sheffield et al. | 239/102 |
| 4,150,925 | 4/1979 | Perkins | 417/418 |
| 4,347,812 | 9/1982 | Kosuda et al. | 123/90.55 |
| 4,522,163 | 6/1985 | Hooper | 123/73 F |
| 4,615,307 | 10/1986 | Kodama et al. | 123/90.16 |
| 4,617,306 | 10/1986 | Welzel et al. | 514/288 |
| 4,631,923 | 12/1986 | Smith | 60/530 |
| 4,696,265 | 9/1987 | Nohira | 123/90.16 |
| 4,789,208 | 12/1988 | Kohno | 303/115 |
| 4,860,794 | 8/1989 | Parrott et al. | 137/637 |
| 4,911,405 | 3/1990 | Weissgerber | 251/129.14 |
| 4,938,545 | 7/1990 | Shuey et al. | 303/119 |
| 4,988,074 | 1/1991 | Najmolhoda | 251/129.08 |
| 5,421,366 | 6/1995 | Naffziger et al. | 137/614.2 |
| 5,456,581 | 10/1995 | Jokela et al. | 417/282 |
| 5,467,797 | 11/1995 | Seetharaman et al. | 137/599 |
| 5,549,274 | 8/1996 | Buchanan et al. | 251/129.14 |
| 5,605,317 | 2/1997 | Mealy et al. | 251/129.01 |
| 5,611,370 | 3/1997 | Najmolhoda | 137/625.61 |
| 5,647,318 | 7/1997 | Feucht et al. | 123/322 |
| 5,673,658 | 10/1997 | Allmendinger | 123/90.12 |
| 5,687,765 | 11/1997 | You | 137/627.5 |
| 5,738,142 | 4/1998 | Eike et al. | 137/596.17 |
| 5,765,515 | 6/1998 | Letsche | 123/90.12 |
| 5,809,950 | 9/1998 | Letsche et al. | 123/90.12 |
| 5,845,667 | 12/1998 | Najmolhoda et al. | 137/1 |
| 5,915,348 | 6/1999 | Scheidt et al. | 123/90 |
| 5,921,526 | 7/1999 | Najmolhoda | 251/65 |
| 5,984,259 | 11/1999 | Najmolhoda et al. | 251/50 |
| 5,996,628 | 12/1999 | Najmolhoda et al. | 137/625.61 |
| 6,019,120 | 2/2000 | Najmolhoda et al. | 137/82 |
| 6,209,563 | * 4/2001 | Seid et al. | 137/15.21 |

* cited by examiner

*Primary Examiner*—Gerald A. Michalsky

(57) ABSTRACT

An engine oil solenoid actuated control valve includes a molded one-piece member that defines a check valve-receiving region and a coil bobbin region of the solenoid. The check valve-receiving region includes an integral check valve-receiving receptacle associated with an exhaust port of the control valve. A check valve is received in the receptacle. A solenoid armature is received in the coil bobbin region on which a solenoid coil is wound. The molded one-piece member receives a fluid port-forming sleeve member that provides a supply port and control port. A spool valve is received in the port-forming sleeve member and includes a spool valve end connected to the armature of the solenoid. The spool valve includes first and second lands that are moved relative to the respective fluid supply port and control port to control fluid flow at the control port. A fast response, high flow rate is provided by a preselected gap provided between the end of the armature and a pole piece in the bobbin region together with an annular control port configuration.

12 Claims, 2 Drawing Sheets

HIGH FLOW SOLENOID CONTROL VALVE

This application is related to U.S. application entitled "SOLENOID CONTROL VALVE" (Ser. No. 09/479,415, now U.S. Pat. 6,209,563) of common inventorship herewith, the teachings of which are incorporated herein by reference.

FIELD OF THE INVENTION

The present invention relates to an engine oil solenoid control valve for controlling oil pressure for valve lifter activation/deactivation.

BACKGROUND OF THE INVENTION

Internal combustion engines for motor vehicles are known which include a hydraulic system for performing work in addition to lubrication. This work can be used to activate/deactivate cylinders of an internal combustion engine to conserve fuel. Such a hydraulic valve lifter activation/deactivation system can include a hydraulic control valve in a valve housing mechanically connected to a separate solenoid. The solenoid includes a solenoid coil bobbin on which a wire coil is wound and an armature that moves the control valve in response to an input signal (coil electrical current signal) to the wire coil to control hydraulic pressure in the valve lifter oil control gallery. A separate check valve assembly is mounted in a fluid exhaust passage (vent-to-sump) in the engine block or cylinder head and functions to maintain oil pressure in the oil control gallery at a preselected minimum value. Such engine oil control solenoids comprise numerous components which must be assembled together and are known to suffer from hydraulic fluid (oil) leakage through various paths around the solenoid housing. An object of the present invention is to provide an improved engine oil solenoid control valve.

SUMMARY OF THE INVENTION

The present invention provides a hydraulic fluid solenoid control valve, such as in one embodiment, an engine oil solenoid control valve including a molded one-piece member that defines a check valve-receiving region and a coil bobbin region of the solenoid. The check valve-receiving region includes an integral check valve-receiving receptacle associated with an exhaust port of the control valve. A check valve is received in the receptacle. A solenoid armature is received in the coil bobbin region on which region a solenoid coil is wound.

In a particular embodiment of the invention, the molded one-piece member includes an end proximate the check valve-receiving region that receives a fluid port-forming sleeve member that provides a supply port and control port. A spool valve is received in the port-forming sleeve member and includes a spool valve end connected to the armature of the solenoid. The spool valve moves in response to movement of the solenoid armature in response to electrical current signals supplied to the solenoid coil. The spool valve includes first and second lands that are moved relative to the respective fluid supply port and control port to control fluid flow at the control port.

In a preferred embodiment of the invention, a fast response, high flow rate is provided by a preselected gap provided between the end of the armature and a pole piece in the coil bobbin region together with an annular control port configuration and cylindrical spool lands. The preselected gap in turn defines a spool valve open position relative to the control port where, at the valve open position, a flow area is provided to the control port equal to the circumference of the annular control port configuration multiplied times the gap distance by which the spool land opens at the control port.

The foregoing and other objects, features, and advantages of the invention will become apparent from the following more detailed description taken with the accompanying following drawings.

DESCRIPTION OF THE INVENTION

Figure 1:
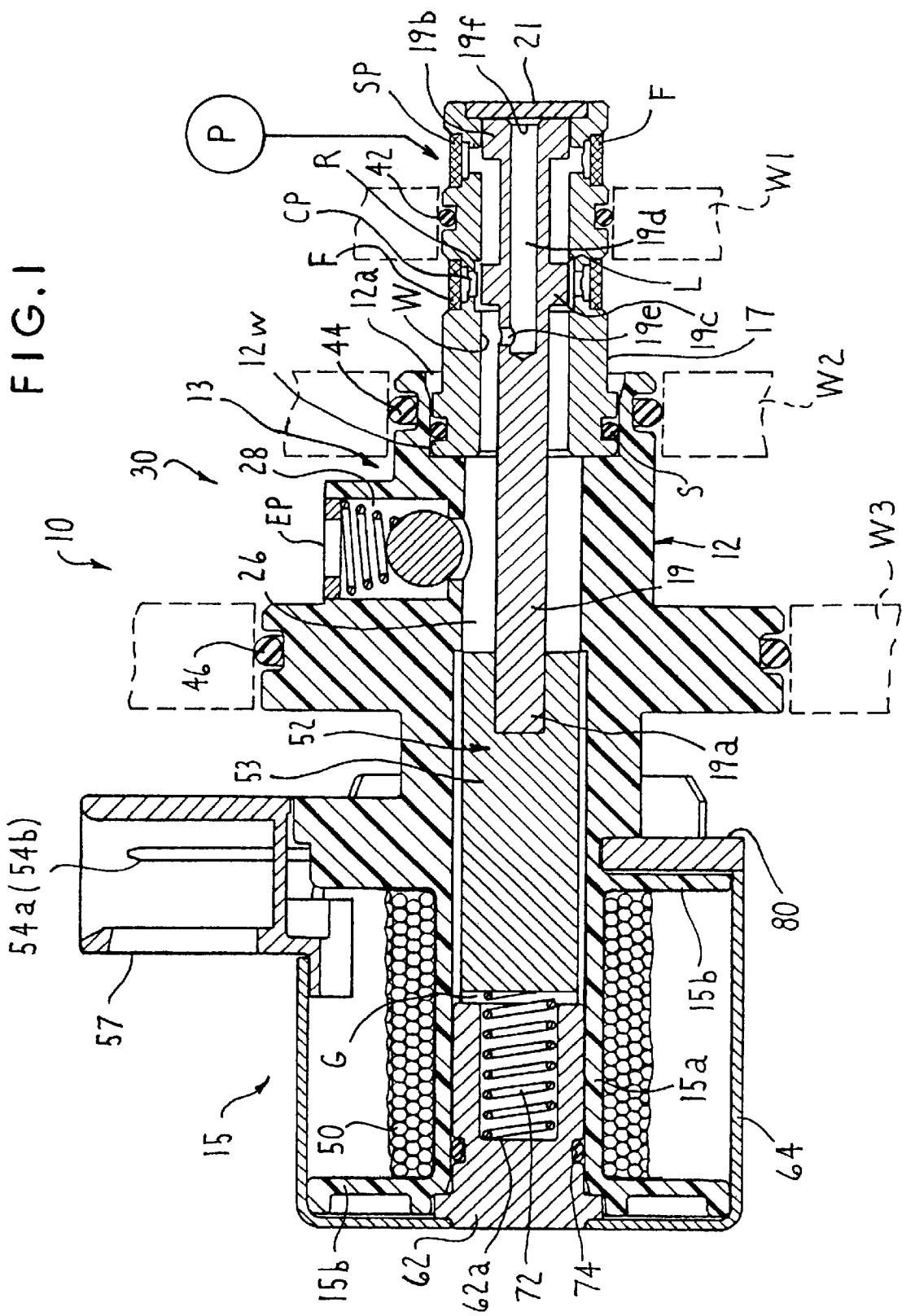
FIG. 1 is a longitudinal sectional view of an engine oil solenoid actuated control valve pursuant to an embodiment of the invention with the spool valve shown in the closed position relative to the control ports.
Figure 2:
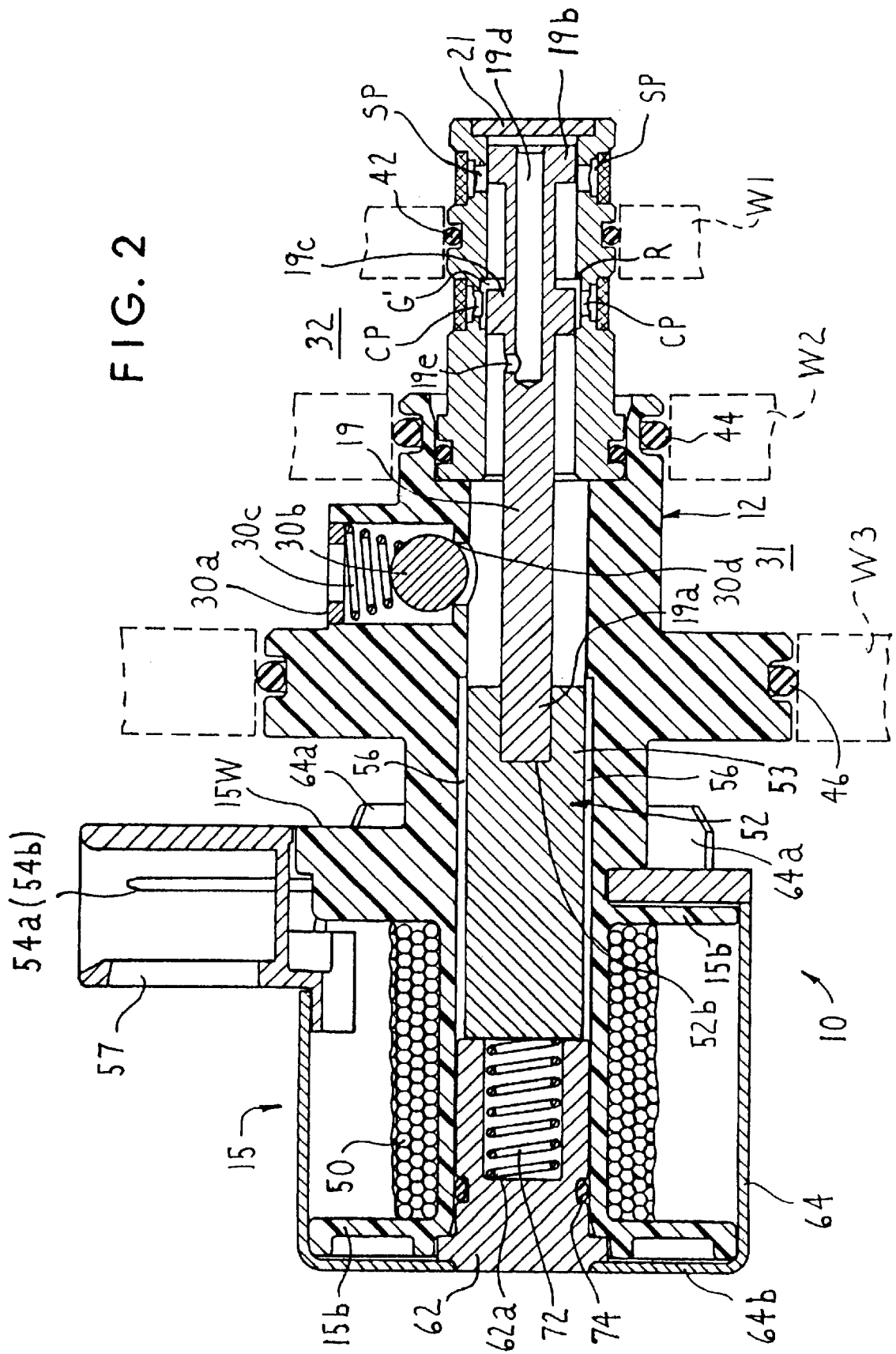
FIG. 2 is a similar longitudinal sectional view of the engine oil solenoid actuated control valve pursuant to an embodiment of the invention with the spool valve shown in the open position relative to the control ports.

Referring to FIGS. 1–2, an engine oil solenoid control valve 10 pursuant to an illustrative embodiment of the invention is shown including a molded one-piece check valve nozzle and bobbin member 12 forming a check valve-receiving region 13 and a coil bobbin region 15. The member 12 can be injection or otherwise molded of a moldable thermoplastic material, such as the high temperature rated, glass fiber reinforced thermoplastic material (e.g. Amodel A1133HS material available from Amoco Polymers, Inc.), or other suitable moldable material.

The molded one-piece member 12 includes an open end 12a proximate the check valve-receiving region 13 that receives a tubular fluid port-forming metal (e.g. aluminum) sleeve member 17 that provides a pair of diametrically opposite supply ports SP and diametrically opposite control ports CP on the sleeve member 17. A fluid seal S is provided between the sleeve member 17 and the inner wall 12w of the open end 12a. The outermost end of the sleeve member 17 is sealed closed by a plug or plate 21. A spool valve 19 is received in a cylindrical axial bore of port-forming sleeve member 17 and includes a spool valve end 19a connected to a solenoid armature 52. The spool valve 19 moves in response to movement of the solenoid armature 52 in response to electrical current signals supplied to the solenoid coil 50. The spool valve 19 includes first and second cylindrical sealing surfaces or lands 19b, 19c that are moved relative to the respective fluid supply ports SP and control ports CP to control fluid flow at the control ports. The spool valve 19 may include additional lands (not shown) to prevent binding of the spool valve 19 in the axial bore of sleeve member 17. Annular fluid filters F can be provided in annular grooves on the sleeve member 17 for the supply ports SP and control ports CP. The control ports CP are communicated to one another by an annular recessed control port chamber or region R extending circumferentially about the inner wall W of the sleeve member 17 and relative to which the spool land 19c moves to open or close the control port chamber or region R as described below.

The supply ports SP are communicated to a source of hydraulic fluid pressure, such as a main engine oil pressure port shown schematically as P, in an internal combustion engine block or cylinder head. The control ports CP are communicated to a control passage 32 that supplies hydraulic fluid to an oil control gallery (not shown) of a hydraulic valve lifter activation/deactivation circuit provided in the engine block or engine cylinder head (not shown).

A longitudinal armature bore or passage 26 is defined in part in the region 13 and communicates to a check valve 30 residing in a receptacle 28 formed in boss 29 that is molded integrally on the member 12. The receptacle 28 defines an exhaust port EP. Passage 26 communicates to the axial bore of sleeve member 17. The check valve 30 includes annular cap 30a that is held in the receptacle 28 by heat stacking or ultrasonic welding and a ball check valve 30b made of steel (e.g. type 440C steel) and located between a biasing spring 30c and ball valve seat 30d. Ball valve seat 30d can be formed integral to member 12 by molding or comprise a separate insert in the nozzle region. The check valve 30 communicates to an exhaust passage 31 of the hydraulic valve lifter activation/deactivation circuit. The check valve 30 is provided at the exhaust port EP to prevent oil pressure in the oil control gallery (not shown) of the hydraulic valve lifter activation/deactivation circuit from falling below a preselected minimum oil pressure value such as, for example only, 3 psi, when the hydraulic valve lifter activation/deactivation system is deactivated.

The spool valve 19 includes a longitudinal bore or passage 19d that communicates at one end to a radial bore 19e that in turn communicates to the axial bore of sleeve member 17 and armature bore 26. At the other opposite end 19f of the spool valve, the passage 19d communicates to any hydraulic fluid that leaks from the supply port SP past land 19b so as to fluid pressure balance the spool valve 19.

The region 13 and sleeve member 17 include respective first and second O-ring seals 44, 42 that are disposed in a circumferential groove molded integrally in the member 12 and a circumferential groove formed in sleeve member 17. Seals 44, 42 mate with walls W2, W1 of a fluid control passage 32 of a hydraulic valve lifter activation/deactivation circuit provided in the engine block or engine cylinder head (not shown) with the control passage 32 supplying hydraulic fluid to the oil control gallery. A third O-ring seal 46 is provided in a circumferential groove molded integrally on larger diameter region 13 of member 12 and together with O-ring 44 mate with walls W3, W2 of a fluid exhaust passage 31 of a hydraulic valve lifter activation/deactivation circuit provided in the engine block or engine cylinder head (not shown) with fluid exhaust passage 31 providing for return of hydraulic fluid to a low pressure sump. As mentioned above, check valve 30 is provided at the exhaust port EP to prevent oil pressure in the oil control gallery of the hydraulic valve lifter activation/deactivation circuit from falling below a preselected minimum oil pressure value such as, for example only, 3 psi, when the valve lifter activation/deactivation system is deactivated.

In particular, at the closed spool valve position of FIG. 1, the control land 19c does not completely close off the region R of control ports CP such that there is a preselected underlap (gap) L of the land 19c at region R of control ports CP (e.g. 0.003 inch gap) controlled by bias of armature spring 72 and effective to provide a 3 psi hydraulic pressure at control ports CP and at check valve 30 in armature bore 26 in the closed spool valve position when the valve lifter activation/deactivation system is deactivated. The underlap L communicates the control ports CP and armature bore 26 to supply port SP enough to provide the 3 psi fluid (oil) pressure at control ports CP and check valve 30. The underlap L is controlled by bias of armature spring 72. As an example of the 3 psi underlap, if there is 20 psi hydraulic pressure at the supply port SP, a 3 psi hydraulic pressure can be provided by underlap L at the control ports CP and check valve 30, which opens, as necessary, to allow fluid flow through exhaust EP to maintain 3 psi in the oil control gallery that is communicated to control ports CP. The check valve 30 thus opens against bias of spring 30c as necessary to maintain a 3 psi (or other) oil pressure at the control ports and the oil control gallery when the valve lifter activation/ deactivation system is deactivated.

The coil bobbin region 15 includes an electromagnetic wire coil 50 (partially shown) wound on bobbin sleeve 15a along the length thereof between annular bobbin end walls 15b. The coil 50 is connected to a source of input signals, such as an engine electronic control (EEC) module (not shown), that provides electrical current signals to the coil 50 to control movement of an armature 52 that, in turn, controls the position of a spool valve 19 between the closed/open valve positions (on/off) to control hydraulic pressure in the valve lifter oil control gallery. The solenoid coil 50 receives the current signals via electrical connectors 54a, 54b that reside in a molded connector housing 57 disposed on member 12 and that are connected to the coil. The connectors 54a, 54b are connected to the signal source (EEC module).

The spool valve 19 is moved between the valve closed position, FIG. 1, and valve open position, FIG. 2, in response to electrical current signals supplied to solenoid coil 50 from the EEC module (not shown). The spool valve 19 is moved to the open position to activate the hydraulic valve lifter activation/deactivation system (not shown) and to the valve closed position to deactivate the hydraulic valve lifter activation/deactivation system.

A simple generally cylindrical armature rod 53 can be used as the armature 52 in an embodiment of the present invention that further includes molded integral arcuate recesses 56 in bore 26. The recesses 56 extend radially into the armature bore 26 on diametrically opposite sides of the bore 26 and along the axis of bore 26 to provide axial paths for hydraulic fluid on opposite lateral ends of the armature 52 to eliminate any imbalanced hydraulic pressures acting thereon (hydraulic lock condition where the armature would remain in open or closed positions) as further described in U.S. application entitled "SOLENOID CONTROL VALVE" (Ser. No. 09/479,415, now U.S. Pat. No. 6,209,563) of common inventorship herewith, the teachings of which are incorporated herein by reference. The armature rod 53 typically is made of ferrous material such as steel. A simple, low cost armature rod 53 can be used without the need for a complex geometry armature.

The armature 52 includes an axial end bore 52b in which the end 19a of the spool valve 19 is pressed in interference fit to a preselected axial dimension dictated by the depth of bore 52b. This controlled dimension of the spool valve end in the armature bore 52b permits close control of the axial gap G provided between ferromagnetic armature 52 and a ferromagnetic (e.g. steel) pole piece 62 without the need for a calibration of the axial gap. The pole piece 62 is disposed in an end bore of the coil bobbin region 15 by radially compressive forces of O-ring 74 disposed on the pole piece.

In a preferred embodiment of the invention, a fast response, high flow rate control valve is provided by preselected gap G provided between the end of the armature 52 and pole piece 62 in the bobbin region 15 together with annular circumferentially recessed control port chamber or region R. The preselected gap G in turn defines a spool valve open position, FIG. 2, relative to the control port chamber or region R where, at the open valve position, a flow area is provided to control ports CP equal to the circumference of the annular recessed control port chamber or region R multiplied times the gap axial distance G' by which the spool land 19c opens at the control port chamber or region R as a result of the armature end closing the gap G, FIG. 2, when the appropriate electrical current signals are supplied to the solenoid coil 50.

The solenoid can or housing 64 typically is made of steel or other magnetically permeable material and includes an axial end flange 64b to axially retain the pole piece 62. The solenoid housing 64 is joined to the member 12 by circumferential or radial tabs 64a crimped to overlie the end wall 15w of the coil bobbin region 15 and the flux washer 80. Tabs 64a are shown prior to crimping in FIGS. 1–2.

A steel flux washer 80 is disposed on the member 12 in a position to concentrate magnetic flux at the armature 52 residing in the armature bore 26. The washer 80 extends about approximately 85% of the periphery of the armature 52.

The pole piece 62 is provided with a controlled axial dimension blind bore 62a that receives the end of the spring 72 to avoid the need to calibrate the spring preload using a set screw.

The engine oil solenoid control valve of the invention can be used to control oil pressure in the oil control gallery of an internal combustion engine as part of a hydraulic valve lifter activation/deactivation system. The engine oil solenoid control valve can be made pursuant to a method of the invention by assembling the various solenoid components described above in the molded one-piece check valve nozzle and coil bobbin member.

Although certain preferred embodiments of the invention have been shown and described in detail, it should be understood that variations or modifications may be made without departing from the spirit or scope of the present invention.

What is claimed is:

1. A hydraulic fluid solenoid valve, comprising a one-piece member forming a solenoid coil bobbin region and an integral check valve-receiving region having a check valve-receiving receptacle communicated to a fluid exhaust port, a solenoid armature, a fluid control valve movable relative to a fluid control port in response to armature movement, a check valve disposed in said receptacle, and a solenoid coil on the coil bobbin region for receiving electrical signals to control armature movement.

2. The valve of claim 1 wherein said armature comprises a cylindrical armature rod.

3. The valve of claim 1 wherein said member defines an armature bore having molded integral first and second arcuate recesses that balance hydraulic pressure on the armature.

4. A method of making a hydraulic fluid solenoid actuated valve, comprising providing a one-piece member defining a solenoid coil bobbin region and an integral check valve-receiving region having a check valve-receiving receptacle communicated to a fluid exhaust port, disposing a sleeve member having a supply port and control port and a fluid control valve in said one-piece member, disposing a check valve in said receptacle, disposing a solenoid coil on the coil bobbin region, and disposing a solenoid armature in a bore of the coil bobbin region.

5. The method of claim 4 further including molding said member to include an armature bore having molded integral first and second arcuate recesses that balance hydraulic pressure on the armature.

6. The method of claim 4 including disposing a spool valve in said sleeve member.

7. A hydraulic fluid solenoid valve, comprising a one-piece member forming a solenoid coil bobbin region and an integral check valve-receiving region having a check valve-receiving receptacle communicated to a fluid exhaust port, said one-piece member including an end proximate the check valve-receiving region with said end receiving a fluid port-forming sleeve member that provides a fluid supply port and a fluid control port, a solenoid armature, a fluid control valve movable relative to the control port in response to armature movement, a check valve disposed in said receptacle, and a solenoid coil on the coil bobbin region for receiving electrical signals to control armature movement.

8. The valve of claim 7 wherein said control valve comprises a spool valve received in the port-forming sleeve member and having a spool valve end connected to the armature of the solenoid, said spool valve moving in response to movement of the solenoid armature when electrical current is supplied to the solenoid coil.

9. The valve of claim 8 wherein the spool valve includes first and second lands that are moved relative to the respective fluid supply port and control port to control fluid flow at the control port.

10. The valve of claim 13 wherein a preselected gap is provided between an end of the armature and a pole piece in the bobbin region to define a spool valve open position relative to the control port.

11. The valve of claim 10 including an annular control port chamber and cylindrical spool land proximate said control port such that a fluid flow area is provided at the control port equal to the circumference of the annular control port chamber multiplied by the gap by which the spool land opens at the control port.

12. The valve of claim 10 wherein said pole piece has a blind bore to receive an armature biasing spring.

* * * * *

UNITED STATES PATENT AND TRADEMARK OFFICE
CERTIFICATE OF CORRECTION

PATENT NO. : 6,321,767 B1
DATED : November 27, 2001
INVENTOR(S) : David L. Seid et al.

Page 1 of 1

It is certified that error appears in the above-identified patent and that said Letters Patent is hereby corrected as shown below:

<u>Column 6,</u>
Line 39, replace "13" with -- 7 --.

Signed and Sealed this

Fourteenth Day of May, 2002

*Attest:*

*Attesting Officer*

JAMES E. ROGAN
*Director of the United States Patent and Trademark Office*